3,202,275
COATED CUP AND METHOD OF COATING
THE SAME
Roy G. Loughary, P.O. Box 6727, Portland 66, Oreg.
Filed Oct. 8, 1963, Ser. No. 314,665
2 Claims. (Cl. 206—65)

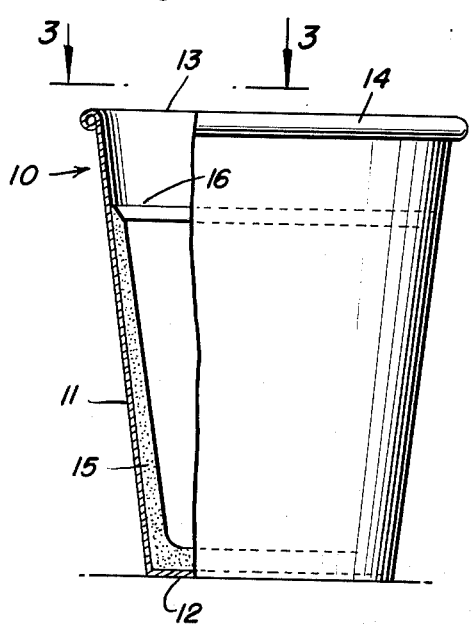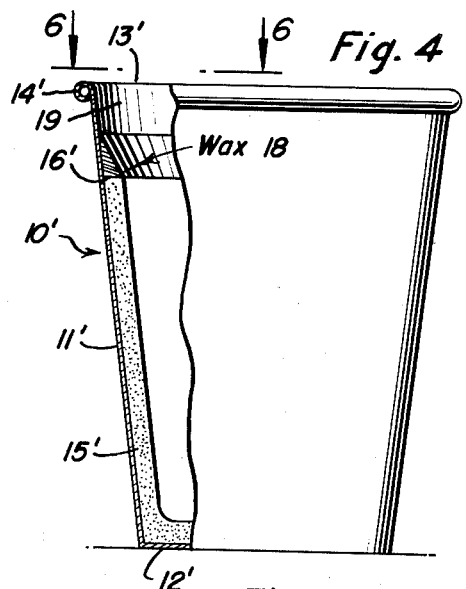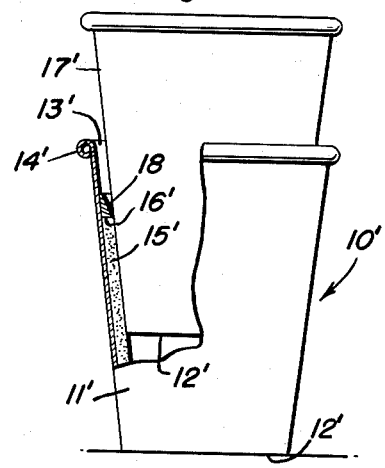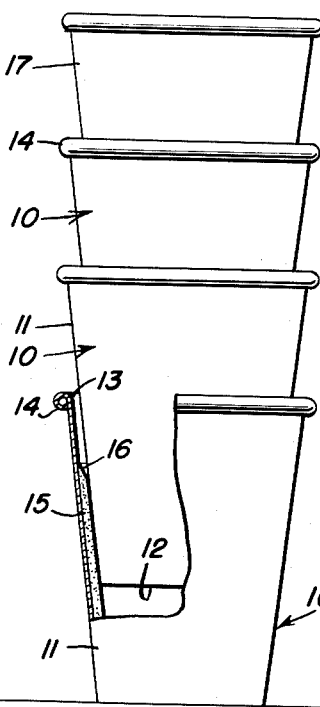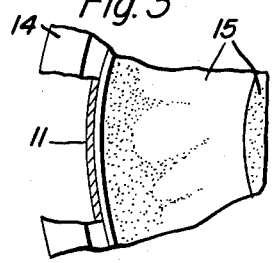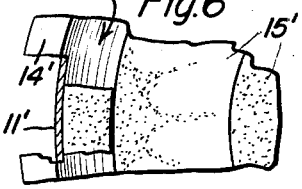
INVENTOR
Roy G. Loughary
BY John A. Mawhinney
ATTORNEY

United States Patent Office 3,202,275
Patented Aug. 24, 1965

The present invention relates to a coated cup and method of coating the same and has for an object to provide a cup of this kind in which substantially the entire inner surface of the cup is coated with a coating of a substance in concentrated form which is dissolvable in a liquid to produce a liquid for human consumption.

The present invention relates to the making of a beverage such as tea, coffee or a soft drink, or a medicine in liquid form in which a concentrate of the substance which it is desired to convert into a beverage or liquid is made use of. The present conventional practice is to provide the concentrate in granular or powder form put up in packages for individual use, that is, sufficient of the concentrate is contained in one package or envelope to make a beverage of the desired strength when placed in a standard size cup and the cup then filled with hot or cold water.

The present invention contemplates the elimination of the necessity for such separate packages of the concentrated material and provides a cup in which substantially the entire inner surface thereof is coated with the concentrated material.

It has been proposed as illustrated in U.S. Patent No. 1,770,118 granted July 8, 1930 to William Mortimer Williams to provide a quick beverage cup. In this patented disclosure a beverage concentrate 3 in the form of a fluid substance is poured into the bottom of the cup 1. A sealing disc 4 is required to protect the concentrate from adhering to the bottom of the nested cup. The provision of the sealing disc 4 necessitates the use of a string 5 and a pulling tab 6 for removal of the disc 4.

It is an aim of the present invention to improve upon this Williams' patented cup by eliminating the necessity for the sealing disc 4, string 5 and tab 6, to eliminate stirring sticks and the operation of stirring, to produce a homogeneous solution, that is, one in which the concentrate is dispersed uniformly throughout the solvent liquid without the necessity of stirring, and to eliminate waiting for the entire mass of the concentrate at the bottom of the cup to dissolve completely in order to obtain a liquid of the desirable strength and flavor in the uppermost portion of the cup.

These objectives are obtained by coating not only the bottom of the cup but also substantially the entire inner surface of the side wall or walls of the cup.

A further object of the present invention is to provide a cup of this kind which is made of tapered formation or frustoconical shape so that the cups can be stacked in nested formation whereby the side wall of each cup protects the coated inner surface of the side wall of the adjacent cup in which said each cup is nested against the entrance of moisture and other extraneous matter.

When an effervescent concentrate is applied to the inner surface of the cup, the coating of the effervescent concentrate terminates short of the upper edge of the cup to provide an uncoated area to which is applied a ring or band of wax or paraffin so that the outer surface of the side wall of the nested cup engages this wax ring and makes an additional moisture proof connection therewith.

The present invention further contemplates the provision of a coated cup which is of the disposable type and capable of receiving and retaining either hot or cold liquids.

Moreover the present invention has for an objective the provision of a method of coating the inner surface of the side wall of a cup with a coating of a substance which is dissolvable in a liquid to produce a liquid suitable for human consumption comprising the steps of applying the substance to the inner surface of the side wall of the cup and rotating the cup about its own axis while in a tilted position to cause the substance to adhere to substantially the entire inner surface of the side wall of the cup.

It is also contemplated that the method include the further step of pressing the substance to the side wall of the cup with a pressing tool.

A still further object of the present invention is to provide a method of coating the inner surface of the side wall of the cup with a coating of a substance which is dissolvable in a liquid to produce a liquid suitable for human consumption comprising steps of mixing the substance in the dry state with enough water to make the mixture flowable, rotating the cup about its own axis when tilted to cause a mixture to flow over substantially the entire surface of the side wall of the cup and subjecting the cup and the mixture to heat between rotations of the cup until the mixture dries out and adheres to the inner surface of the side wall of the cup.

Other objects, features and advantages of my invention will be apparent from the following description when considered together with the accompanying drawings.

In the drawings, wherein like reference numerals denote corresponding parts throughout the several views:

FIGURE 1 is a side elevational view of a cup constructed in accordance with the present invention with parts broken away and with parts in section, FIGURE 2 is a side elevational view of a plurality of the cups arranged in stacked nested formation with parts of the lowermost cup cut away and parts in section, FIGURE 3 is a view taken on the line 3—3 FIGURE 1 with parts broken away and parts in section, FIGURE 4 is a view similar to FIGURE 1 in which a modified form of cup is illustrated, FIGURE 5 is a view similar to FIGURE 2 of the modified form of cup shown in FIGURE 4, and FIGURE 6 is a view taken on the line 6—6 of FIGURE 4 with parts broken away and with parts in section.

Referring more particularly to the drawings and especially to FIGURES 1 through 3, 10 generally indicates a cup constructed in accordance with the present invention. The cup 10 may be of the conventional kind made of paper or fiber sheet material and waterproofed and treated to withstand hot and cold water or other liquid. The cup may be of the disposable variety adapted to be discarded after one use thereof. The cup 10 has a downwardly tapered side wall 11 to produce a cup of frustoconical form so that a plurality of the cups 10 may be stacked in nested formation as illustrated in FIGURE 2 of the drawings.

If desired the cup 10 may be made of plastic foam, which cups are obtainable on the open market.

The cup 10 has a closed bottom 12 and an open upper end 13 which is defined by a lip 14. A coating 15 of a concentrate of the desired material covers the entire closed bottom 12 of the cup and substantially the entire inner surface of the side wall 11 and adheres thereto. It will be noted that the coating 15 extends upwardly along the inner surface of the side wall 11 of the cup for substantially the entire height thereof to a point 16 so that the upper terminal point of the coating is only a relatively short distance from the upper open end 13 of the cup.

The coating 15 may be made of instant tea or instant coffee which is sold under the trademark Maxwell House Coffee by General Foods Corporation, Institutional Products Division, White Plains, New York. Salada Iced Tea Mix manufactured by Salada Foods Inc., Woburn, Massachusetts, Instant Chicken Broth, Instant Mix Vegetable Broth, and Instant Prime Broth Mix manufactured by Romanoff Caviar Company, New York, New York, may also be used.

The coating 15 may also be made from Carnation Instant Hot Cocoa Mix distributed by Carnation Company, Los Angeles, California.

Also a powdered instant beverage mix made in accordance with U.S. Patent No. 3,023,106 granted February 27, 1962, to James L. Common and assigned to General Foods Corporation, White Plains, New York, or a cocoa beverage powder made in accordance with U.S. Patent No. 3,028,242, granted April 3, 1962, to James F. Hale et al. and assigned to The Borden Company, New York, New York, may be used in the practice of this invention.

In applying the coating 15 to the inner surface of the cup 10 any one of the above substances or materials in dry powdered form is mixed with just enough hot water to make the mix sufficiently liquid to flow. The powdered substance or material in dry form is placed in the cup and the proper amount of hot water added thereto and the cup is then rotated while holding it in a tilted position. The rotation of the cup is about its own axis and may be done by hand and the rotation of the cup is continued until the mix has dried sufficiently to adhere to the bottom and side wall of the cup 10 to form the coating 15. The drying action of the mix can be hastened by placing the cup in a heated oven between rotations of the cup. It is also contemplated by this invention that the rotation of the cup about its axis while in a tilted position can be effected by a simple conveyor carrying rotation cup holders and passing the cups while being rotated under infra-red lamps. The liquefied concentrate substance or material can be sprayed upon the bottom and inner surface of the side wall 11 of the cup and then subjected to the rotation and the heat treatment described above.

It has been found that by the use of the above described methods the coating 15 of the concentrated substance or material will adhere firmly to the bottom and the side wall 11 of the cup even when the cups are stacked in the nested arrangement illustrated in FIGURE 2 of the drawings so that the side wall of each cup protects the coated inner surface of the adjacent cup in which said each cup is nested against the entrance of moisture and other extraneous matter. The uppermost cup 17 is similar in structure to the other cups 10 but is left uncoated since the interior of this uppermost cup would be exposed to the atmosphere and to dust and the like in the atmosphere. The cups are stacked as shown in FIGURE 2 and then placed in a suitable container for transportation to the point of use.

In the use of the cups 10 either hot or cold water may be introduced into the cup and the coating which is dissolvable in either hot or cold water will immediately begin to dissolve and since the coating covers substantially the entire inner surface of the cup the dissolving of the coating 15 will take place simultaneously throughout substantially the entire height of the cup to produce the homogeneous liquid which is of uniform strength and flavor throughout the entire area of the interior of the cup. As a result it is not necessary to stir the contents of the cup so that the necessity of providing stirring sticks is eliminated.

Another advantage of the cup made in accordance with the present invention is that it eliminates any period of waiting for the entire mass of the concentrated substance or material to completely dissolve which is a disadvantage of such cups as described in the U.S. Patent No. 1,770,118 referred to above and also in the U.S. Patent No. 2,915,176 granted December 1, 1959, to John G. O'Neil. In those patented cups since the concentrated material is disposed at the bottom thereof it is necessary to wait until the entire mass of the concentrate has thoroughly dissolved and it is necessary to stir the bottom portion of the liquid in those cups so as to cause the partially dissolved concentrated material to rise upwardly in the remainder of the liquid in the cup so that the upper portion of the liquid in the cup will receive its share of the concentrate. However, with the present coated cup since substantially the entire height of the inner surface of the side wall of the cup is coated with the concentrated material the entire column of liquid in the cup will be simultaneously flavored by the concentrate.

In the form of the invention illustrated in FIGURES 4 through 6 of the drawings, the cup is substantially the same as the cup 10 illustrated in FIGURES 1 through 3 and corresponding parts are indicated by the same reference numerals primed as those used in FIGURES 1 through 3 of the drawings.

In this form of the invention, the coating $15^1$ is made from an effervescent concentrated substance or material such as Alka-Seltzer manufactured by Miles Products Division of Miles Laboratories Inc., Elkhart, Indiana, or a powder made in accordance with U.S. Patent No. 2,211,485, granted August 13, 1940, to Frederick J. Zimmermann, covering effervescent acetyl salicylic acid compositions or the effervescing composition in particle form as covered by U.S. Patent No. 3,082,091 granted March 19, 1963, to Pierre F. Smith et al. Since the above described substances or materials are of an effervescent nature no water or liquid can be used in the formation and applying of the coating $15^1$ to the inner surfaces of the cup $10^1$. A concentrated substance or material in dry powder form is pressed onto the bottom $12^1$ and the side wall $11^1$ of the cup. The cup is then rotated while in a tilted position as described above in connection with the formation of the coating 15 of the cup 10. It has been found that the dry powder of the concentrated substance will adhere sufficiently to the inner surface of the bottom and side wall of the cup until a form or pressing tool is introduced into the interior of the cup and pressed against the bottom and side wall thereof so as to further press the dry powder into firmer engagement with the bottom and side wall of the cup.

The cups $10^1$ and $17^1$ can then be stacked in nested formation in the same manner as described above in connection with FIGURE 2 of the drawing, and FIGURE 5 of the drawing shows how the cups $10^1$ and $17^1$ are stacked.

Since the coating $15^1$ comprises an effervescent concentrated substance or material additional moisture sealing means over and above that afforded by nesting the cups with the side wall of one cup overlying and engaging the coating $15^1$ of an adjacent cup, there is provided a band or ring 18 of wax or paraffin. The band 18 is applied to the inner surface of the side wall $11^1$ in the uncoated area 19 of the side wall $11^1$ just above the upper terminal point $16^1$ of the coating $15^1$. As can be seen from FIGURE 5 of the drawing, the outer surface of the side wall of the cup $17^1$ engages the band 18 so as to set up a moisture-proof and dust-proof seal therewith. The inner surface of the band 18 is tapered so as to facilitate the entrance of one cup into another when the cups are arranged in stacked nested formation. In this connection it will be noted that the inner surface of the coating 15 of the cup 10 is of tapered formation to facilitate the entrance of one cup into another without presenting any abrupt shoulders.

The use of the cup illustrated in FIGURES 4 through 6 is the same as that described above in connection with the cup 10, it being merely necessary to select a cup $10^1$ from the stack of cups and introducing either hot or cold water into the interior of the cup and the dissolving of the coating $15^1$ will take place throughout substantially the entire area of the interior of the cup simultaneously.

If desired the coating 15 may be applied to the cup 10 by spraying a solution of the concentrated material onto the bottom and inner surface of the side wall 11 of the cups. The cups can then be rotated and subjected to heat treatment as explained above in connection with the formation of the coating 15.

The cups are of the disposable kind and are intended for a one-time use after which they may be discarded.

While I have described the preferred embodiments of my invention, it is understood that this disclosure is for the purpose of illustration and that various omissions, or changes in arrangements of parts, as well as the substitution of equivalent elements for those herein shown and described, may be made without departing from the spirit and scope of the invention as set forth in the appended claims.

What I claim is:

1. A coated cup comprising a cup having a side wall and a bottom each having an inner surface, a continuous uninterrupted coating adhering directly to substantially the entire inner surface of the side wall and the inner surface of the bottom of the cup and ever exposed to the interior space of the cup, said coating being a substance dissolvable in either a hot or cold liquid to produce a liquid for human consumption, said coating terminating in spaced relation to the lip of the cup so that an uncoated area remains above the terminal point of the coating, and a band of wax deposited on said uncoated area.

2. A plurality of coated cups each cup comprising a frusto conical shaped cup having a side wall and a bottom each having an inner surface, a continuous uninterrupted coating adhering directly to substantially the entire inner surface of the side wall and the inner surface of the bottom of the cup and ever exposed to the interior space of the cup, said coating being a substance dissolvable in either hot or cold liquid to produce a liquid for human consumption, said plurality of cups being arranged in stacked nested relation to one another so that the side wall of each cup protects the coated inner surface of the side wall of the adjacent cup in which said each cup is nested against the entrance of moisture and other extraneous matter, said substance of the coating being a dry effervescent powder, the coating terminating short of the upper edge of the cup to provide an uncoated area, a ring of paraffin covering said uncoated area so that the outer surface of the side wall of each cup engages the paraffin ring of the adjacent cup in which said each cup is nested to effect a moisture tight seal therebetween to protect the effervescent powder from deteriorating.

References Cited by the Examiner
UNITED STATES PATENTS

| | | | |
|---|---|---|---|
| 1,181,963 | 5/16 | Bohlman | 206—65 |
| 1,770,118 | 7/30 | Williams | 206—47 |
| 2,062,897 | 12/36 | Michel et al. | |
| 2,672,981 | 3/54 | Colgren | 206—65 |
| 2,982,673 | 5/61 | Knup | 117—65.2 |
| 3,052,569 | 9/62 | McNamara | 117—95 |

THERON E. CONDON, *Primary Examiner.*

GEORGE O. RALSTON, *Examiner.*